Jan. 31, 1950 J. KIEFFER 2,496,218
METHOD AND APPARATUS FOR DETERMINING
RADIATION DOSAGE
Filed Dec. 16, 1947 3 Sheets-Sheet 2

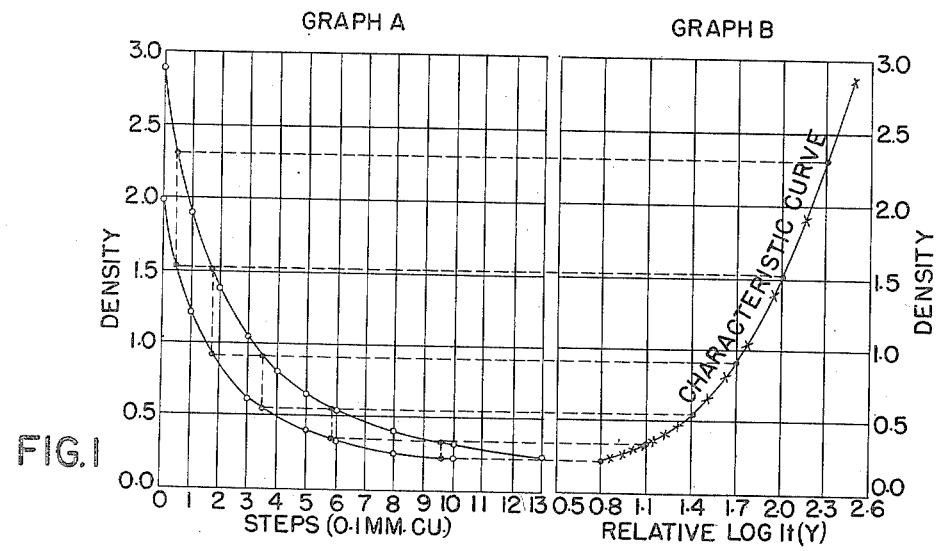
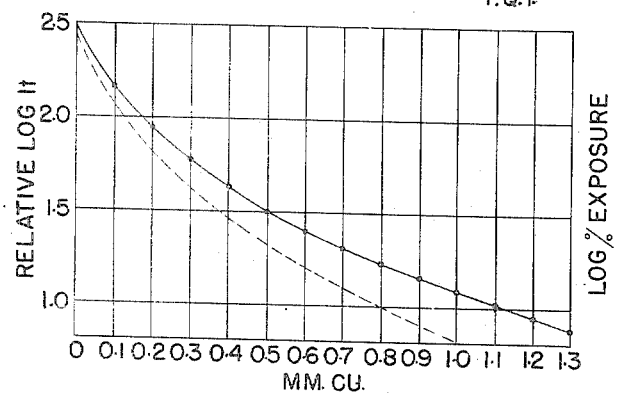
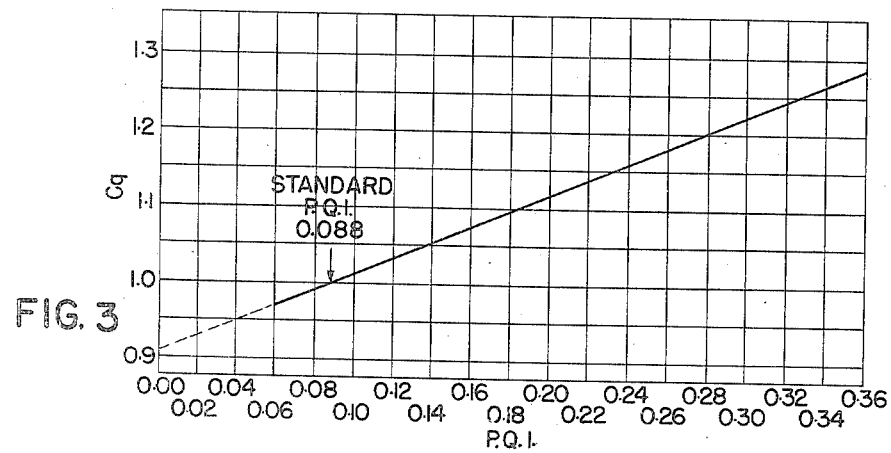

INVENTOR.
JEAN KIEFFER
BY
ATTORNEYS

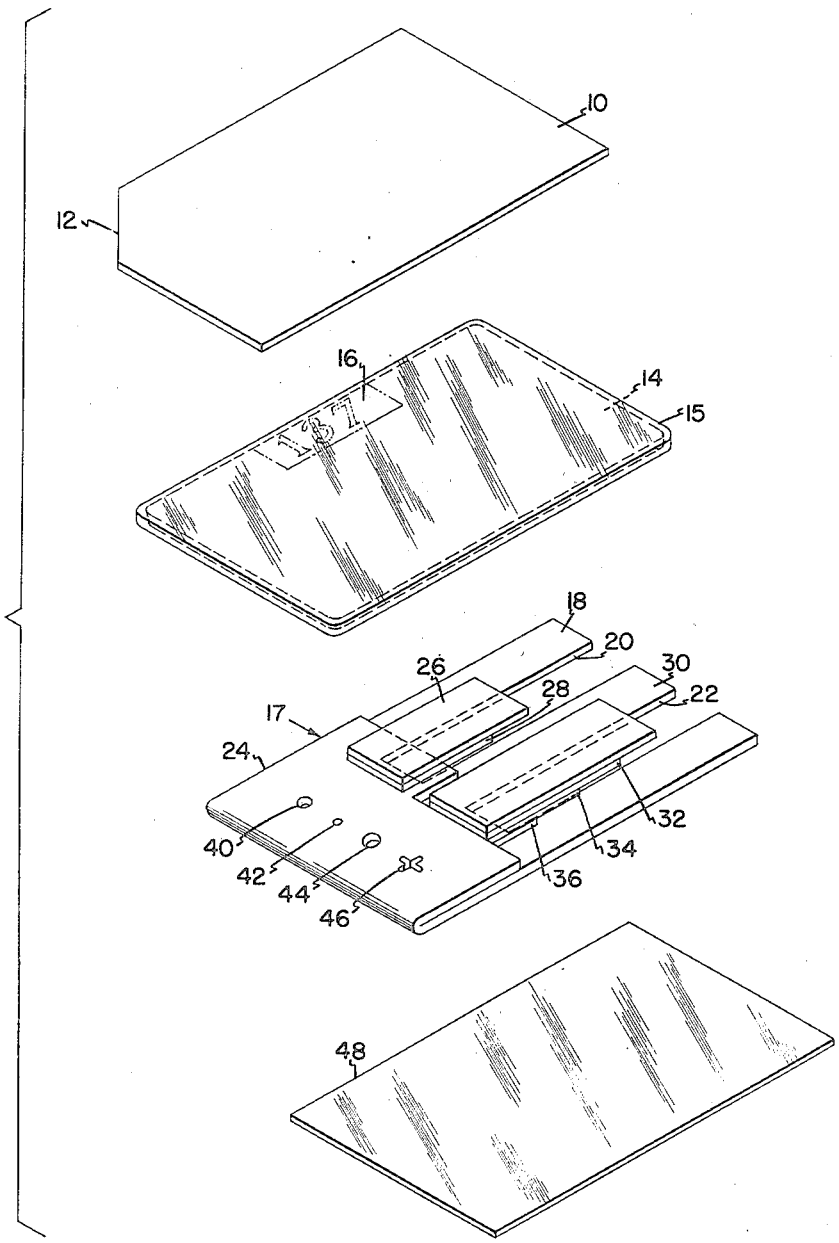

Patented Jan. 31, 1950

2,496,218

UNITED STATES PATENT OFFICE 2,496,218

METHOD AND APPARATUS FOR DETERMINING RADIATION DOSAGE

Jean Kieffer, Norwich, Conn.

Application December 16, 1947, Serial No. 792,028

6 Claims. (Cl. 250—83)

My invention relates to a method and apparatus for determining facts relating to radiation dosage reaching a sensitive film. In one aspect my invention comprises an improvement upon the apparatus disclosed in my prior Patent No. 2,426,884.

The use of radiation-emitting equipment and radioactive materials involves the ever-present danger that workers will unknowingly be subjected to radiation of a quality and quantity sufficient to be dangerous to health if not lethal. Although appropriate protective measures are ordinarily taken in connection with the installation of radiation equipment, there has been no simple and dependable method for periodically determining the cumulative dosage received by persons working with or in the neighborhood of the equipment.

Particularly there has been no simple method for the determination of the quality of the radiation reaching a given place or given person. By "quality" is meant the approximate mean wave lengths of such radiation, or its corresponding half-value layer, or the actual radiation energy distribution of its spectrum, or in simplest term the "hardness" of such radiation. It is known that the biological effect of radiation varies with the quality, therefore a knowledge of the quality of the radiation reaching a given person, even if only approximate, is essential if the effect of such radiation on that person is to be accurately evaluated.

Similarly there has been no simple method for determining the angle at which such doses are received or their degree of scattering. Such knowledge is of definite help in determining the causes of harmful doses and in deciding on remedial measures.

The most important object of my invention is to improve the safety with which radiation-emitting equipment may be utilized.

Another object of my invention is to determine periodically the total amount of radiation to which a person or object has been subjected.

Another object of my invention is to provide a simple portable radiation detector from which cumulative total radiation may be analyzed quantitatively and qualitatively.

Another object of my invention is to provide a simple method for the determination of the characteristic curve of radiation sensitive material with accuracy and with a minimum amount of equipment.

Another object of my invention is a simple method for the determination of the absorption characteristic of radiation, or photo-intensity absorption curves.

An important feature of my invention resides in a small, compact, pack capable of being worn conveniently and containing means for recording the quantity, quality and direction of incidence of radiation reaching a person or object on which the pack is placed.

Another feature of the invention resides in a novel method for obtaining comparative data from a film blackened by unknown radiation dosage and from a film blackened by a known dosage, the method being so carried out that the amount and quality of the unknown dosage may readily be determined by reference to the density of the control film.

To facilitate comprehension of the invention I shall first present a scientific discussion of the principles underlying my novel method and then describe preferred forms of apparatus by means of which the method may conveniently be carried out. Reference will be made to the accompanying drawings in which:

Fig. 1.—Graph A——densities obtained under step tablet: lower curve=average of densities produced by single exposure; upper curve=densities produced by cumulation of two exposures; O=densities obtained under various tablet steps; ●=construction points for characteristic curve; vertical dotted lines represent the density increment for 0.30 log $It$ at the designated points. Graph B——●=construction points, placed on ordinates 0.30 log $It$ apart, for characteristic curve, corresponding to similar points on the curves of Graph A and connected with them by interrupted lines to show the graphic construction employed. For convenience in graphing, a density of 1.5 and a relative log $It$ of 2.0 were used as standard points of departure. X=densities produced under various thicknesses of Cu varying by 0.1 mm. increments from 0.0 to 1.3 mm., and corresponding to the relative log $It$ values used for the construction of the photoabsorption curve (Fig. 2).

Fig. 2. ——=photoabsorption curve obtained from data of Graphs A and B, Fig. 1. From such curves the photo half-value layer can be determined for any filtration as compared with the ionization HVL from conventional absorption curves; PQI is 0.110, and the photo HVL, 0.092. Curve obtained at approximately 100 KVP full-wave valve rectification, 1 mm. Al total filtration, using ultraspeed dental X-ray film.

— — — —=photoabsorption curve of standard beam used in experiments, using ultraspeed dental X-ray film; PQI is 0.088, and the photo HVL, 0.068. The same curve was obtained with slow-speed dental film and slow-speed, fine-grain industrial film.

Fig. 3.—Relation of correction coefficient for quality $Cq$ and photoquality index, PQI, for determination of dosage from film blackening; actual values shown in graph are those for a standard beam of 0.088 PQI; coefficient values for any other beam used as control can be found by using the ratio:

$$\frac{Cq \text{ for tested beam}}{Cq \text{ for contol beam}}$$

graph values approximate only, probably accurate within 5 per cent for PQI values from 0.06 to 0.36.

Fig. 6 is an exploded view in perspective showing the elements constituting the badge.

Figure 4:
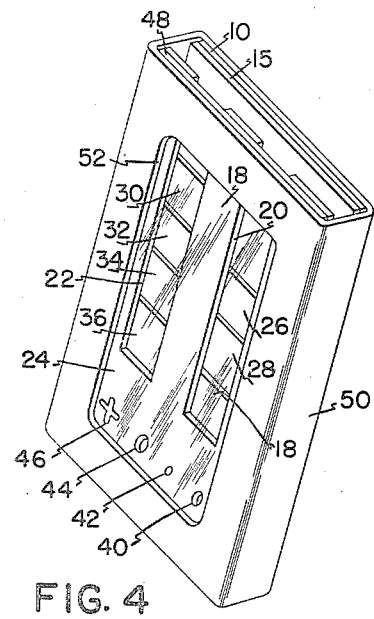
Fig. 4 is a view in perspective showing a preferred form of radiation detector badge, showing the front face thereof.

It is recognized authoritatively that the degree of ionization produced by X-rays is a relative measurement of quantum energy, the intensity of which is expressed as the number of roentgens per unit time. For a beam of radiation having a given intensity, a quality index of the degree of ionization produced, or the amount of energy absorbed, in a unit mass is expressed as the relative absorption in various thicknesses of a material (usually full absorption curves in Cu and Al), a simplified value of which is the HVL (thickness of material that reduces the ionization to one half). The biologic effect is thus expressed as the exposure in roentgens (intensity × time) to radiation of a given tissue absorbability.

To date, the standard free-air ionization chamber has been accepted as the most accurate instrument for measurement of radiation quality and intensity. According to the definition of the roentgen, the only requirement of an X-ray measuring instrument is that it indicate the same number of $r$'s per unit time as the standard air chamber when placed at the same point in a suitably defined beam. The principles of the free-air chamber have been recently extended to the development of the thimble-type chamber, the wall of which is of a material approximating human tissue in density and X-ray absorption. Its accuracy is dependent on calibration with the free-air chamber and the conditions under which it is used. Because extensive laboratory equipment is not required, this instrument is readily employed for the measurement of small doses of scattered and direct radiation in field studies. It is to be noted that such chambers, measuring ionization effects only, can furnish no indication of the direction, degree of scattering, or quality of the radiation they receive. They furnish no permanent record and may be subject to accidental discharges which may vitiate the results.

The photographic effects of X-rays have been studied extensively as a basic science since their discovery in 1895. Most of these studies were based on the Bunsen and Roscoe reciprocity law, $E=It$, and the Hurter and Driffield characteristic curve relating density and the logarithm of exposure, which had been reported previously for visible light. Barkla and Martyn in 1913 concluded that the photographic effect produced by X-ray beams of a given intensity varied with the wave length—the more penetrating or harder the radiation, the smaller the photographic effect. This was confirmed by Berthold and Glocker, Bouvers, and Bell. Bell also showed that, if development variables are eliminated and intensifying screens are not used, the shape of the H. & D. curve is independent of quality; under these conditions the failure of the reciprocity law was found to be negligible (10 per cent or less for an intensity range of 1–10,000). Bell and Henny found that, unless intensifying screens are used, the "intermittency effect" is also negligible. My preliminary work has confirmed these findings. It was concluded that, if a "characteristic curve" representative of the material and development employed is available for a specific quality of radiation, such a curve can be used to determine accurate relative intensities from film blackening when the densities corresponding to the film blackening and the "characteristic curve" are read on the same densitometer or on similarly calibrated instruments. Also, when the effect of quality on film blackening is known, such a curve may be used to determine accurate relative intensities of radiations of varying quality.

To date it has been difficult to duplicate the conditions under which a "characteristic curve" may be determined. For this reason intensity values derived from film blackening have not been sufficiently accurate for comparative measurement of radiation quality and quantity unless extensive laboratory control is applied. A vast amount of sensitometric data has accumulated through many researches, both from the point of view of general radiography and the use of films for radiation measurement. I have found that quantitative errors seldom exceed 5 per cent if films of the same type and emulsion number are developed simultaneously; however, a discrepancy up to 30 per cent was reported if the films are developed at different times, and this error may be increased to 50 per cent or greater if films of different emulsion numbers are used. These errors were found when the conditions of development were supposedly similar. Henny has shown that films of the same emulsion number, developed for 6 instead of 5 minutes, may show an error as great as 100 per cent.

I have invented a simple method for determining the "characteristic curve" (v. s.) under routine conditions for the photometric calibrations of X-ray equipment.

In carrying out my method I prefer to proceed as follows. A metal stair tablet is placed over the film (thickness 0 included), a lateral third of which is covered by a lead mask, and an exposure, $It$ (I=intensity, $t$=time), in roentgens measured by an $r$-meter is made. The strip of lead is then removed and placed over the contralateral third of the film, and a duplicate exposure is made. Upon processing, the film thus furnishes a tablet image divided into three zones. The parts of the film covered with lead receive a single exposure, respectively, whereas the remaining middle third of the film receives both exposures. Thus, the latter zone receives an exposure equal to twice the average of the exposures received by the other zones. The exposures should be so chosen by trial or by known data that a maximum readable density is obtained on step 0 in the zone receiving both exposures. The resulting densities are plotted directly as density vs. filter thickness curves (Fig. 1, graph A), the lower curve being equivalent to the average of the densities determined in the parts of the film receiving a single exposure, and the upper curve representing the density determined in the part of the film receiving the two exposures. In employing the average of the densities obtained for single exposures, any difference in $It$ caused by failure of the equipment to duplicate exposures exactly is minimized in graphing the curve. Applicant has found that a difference in exposure up to 10 per cent usually does not result in a significant difference in the shape of the "characteristic curve." From these two curves points are determined, 0.30 log $It$ apart, corresponding to the density increment produced either by halving or doubling the exposure. A "characteristic curve," density vs. relative log $It$, is determined as shown in Fig. 1, graph B. This curve is similar to an H. & D. (density vs. log time) curve, and is of the same shape, assuming no failure of the reciprocity law. It is characteristic of the material, developing process, and densitometer used. Cumulative errors involved in the determination of this curve were found to be small. Curves obtained from exposure of films of the same emulsion number to varying dosages and qualities of radiation were found to match within 0.02 log $It$ within the range of densities between 0.30 and 3.0, a variation found to be within limits satisfactory for most practical purposes. It is thus possible to determine an unknown dosage, $x$, in $r$'s from the film blackening produced by an X-ray beam of normal incidence and of the same quality as that employed in exposing the film used for the determination of the "characteristic curve" by the equation:

$$x = s \text{ antilog}[(Y_x - Y_s)] \quad (1)$$

wherein $s$ is the dosage in roentgens given this film, and $Y_x$ and $Y_s$ are the relative log $It$ values, corresponding to the film densities produced by $x$ and $s$, respectively, as determined from the "characteristic curve" for the film and processing employed.

An indication of the quality of radiation is derived from the "characteristic curve" in Fig. 1, graph B, by plotting relative log $It$ vs. filter thickness as shown by the curve in Fig. 2, thus resulting in a "photographic absorption curve" characteristic of the beam. Curves obtained by this method are a measure of variation in photographic effect only, and are not directly comparable with ionization absorption curves. It has been shown by Glasser and confirmed in my experiments, that the relationship between photographic and ionization effects changes with the wave length. However, it is reasonable to assume that the two types of curves bear a definite relationship, and that they can be transposed from one type to the other when the ratio "photometric intensity/ionometric intensity" for given conditions is known.

It was found that the slope of this quality curve might be expressed conveniently in an approximate half-value layer to which is applied the term "photographic quality index." This index is derived from the HVL formula, the thickness of filter in millimeters to reduce the intensity of a beam by one half, i. e.

$$\frac{I_o}{I_m} = 2$$

where $I_o$ is the incident radiation intensity, and $I_m$ is the intensity of the beam after passing through filter thickness, $m$. For monochromatic radiation following the law $I = I_o e^{-nd}$, the HVL can be calculated from the equation:

$$\frac{m \log 2}{\log \frac{I_o}{I_m}} \text{ or } \frac{0.30 \ (m)}{\log I_o - \log I_m} \quad (2)$$

Similarly, the quality of a beam is referred to by its photographic quality index:

$$\frac{m \log 2}{\log \frac{(\text{photointensity at } o)}{(\text{photointensity at } m)}} \text{ or } \frac{0.30 \ (m)}{Y_o - Y_m} \quad (3)$$

where $Y_o$ is the relative log $It$ value for the density under step 0, i. e. without filtration, and $Y_m$ the relative log $It$ value for the density caused by the radiation after passing through $m$ filter thickness. The straight-line function is thus assumed for heterogenous radiation. This assumption has been found valid for a first approximation of quality ranging from 60 to 250 KVP when $m$ represents 0.2 mm. Cu. Under these conditions Equation 3 may be expressed as:

$$\frac{(0.2) \log 2}{Y_o - Y_{0.2 \text{ mm. Cu}}} = \frac{0.06}{Y_o - Y_{0.2 \text{ mm. Cu}}} \quad (4)$$

For radiations of penetrating quality greater than 250 KVP, where the difference in density between zero and 0.2 mm. Cu becomes small, the value $m$ may represent greater thicknesses of copper or of materials greater in absorption than copper, such as lead or cadmium.

It is felt that the value of this photographic quality index, designated PQI, is of the same order of significance as the HVL of an X-ray beam. It is derived from photographic effects, whereas the HVL, by definition, is obtained from intensities measured by ionization effects. It is recognized that the PQI per se, as is true with the HVL, does not furnish a complete description of quality. Two X-ray beams of the same PQI might, under certain conditions, vary markedly in quality; nevertheless, two other X-ray beams of the same PQI value are of approximately the same quality when the differences in filtration are not great. It may be added here that the photographic half-value layer, i. e. the filtration which reduces the photographic effect by one half, may be obtained from the photoabsorption curve (Fig. 2) or more directly from the curves in Fig. 1, graph A. The procedure requires two controlled exposures and the graphing of the determinations of film blackening under a minimum of three steps, including steps 0, 0.1, and 0.2 mm. Cu. However, the PQI can be obtained by a single exposure involving the determination of film blackening produced under two steps, i. e. 0 and 0.2 mm. Cu, when the "representative characteristic curve" is known. This markedly simplifies the procedure when a number of measurements are to be made. The PQI has proved as satisfactory as the photographic half-value layer within the general accuracy obtained in dosage measurement by the method here presented.

The determination of dosage results from the fact that an X-ray beam of a given quality will produce a given photographic effect. The resultant film blackening will depend on the type of film and the development conditions. Assuming no failure of the reciprocity law, if the beam quality is kept constant and the development conditions are controlled, film blackening is dependent only on exposure $It$. Under these conditions, the degree of film blackening produced by a known exposure in roentgens can be empirically determined. It is then possible to interpret film blackening as greater or less than a known exposure in roentgens. However, if the "characteristic curve" representative of the material and development conditions and the film blackening due to an exposure to a given dose in $r$ are known, then it is possible to translate film blackening directly into roentgens by Equation 1. However, with beams of a different quality this value of $x$ is no longer a direct expression of the dose in $r$, since the number of $r$'s required to produce a given film blackening varies with quality.

For a beam of a given quality, $a$, the density produced by a known exposure in $r$ is represented on the curve by relative log It $(a)$ or $Y_a$. Similarly, for a beam of a different quality, $b$, the density produced by the same exposure in $r$ is represented by relative log It $(b)$ or $Y_b$. Since the "characteristic curve" is independent of quality, then $Y_a - Y_b$ represents the log of the ratio of the photographic effects, $P_a$ and $P_b$, of the two beams, i. e.

$$\log \frac{P_a}{P_b} = Y_a - Y_b \qquad (5)$$

Thus, film blackening produced by an unknown dose from a beam of known quality, $b$, can be translated into $r$ value upon comparison with the film blackening produced by a known dose in $r$ of a beam of known but different quality, $a$. Equation 1 thus resolves itself into the following:

$$X_b = \frac{P_a}{P_b} S_a [\text{antilog}(Y_{x_b} - Y_{s_a})] \qquad (6)$$

where $X_b$ is the unknown dosage of beam quality $b$, and $S_a$ the known dosage of beam quality $a$.

When a beam of quality $a$ is used as a standard, and the photographic effect, $P_a$, is considered as unity, then $$\frac{P_a}{P_n} = \frac{1}{P_n}$$

wherein $P_n$ is the photographic effect of a beam of any quality. The values of $$\frac{1}{P_n}$$

when determined for beams of different quality in comparison with the standard beam, can be used as coefficients for quality $Cq$. The equation then becomes:

$$X = Cq \ (s) \ [\text{antilog} \ (Y_x - Y_s)] \qquad (7)$$

where $Cq$ is the proper coefficient for the quality of the beam used for the unknown exposure, and $s$ is the value in $r$ of the exposure made with the beam of standard quality.

I have determined the $Cq$ for beams of various qualities expressed in PQI, using a standard beam (80 KVP, fully rectified, 1 mm. Al total filtration, and a PQI value of 0.088). $Cq$ for PQI values ranging from 0.060 to 0.300 are shown in Fig. 3. The graph is only a first approximation; these values will probably require correction dependent on additional experimental work with varying KVP and filtration. Employing the $Cq$ values derived from this graph as correction factors in Equation 7, applicant tested the accuracy of the photographic method by simultaneous exposure of film and a thimble-ionization chamber (condenser-$r$-meter). Direct radiation at a right angle to the film, varying in kilovoltage from 60–250 KVP and in dosage from 0.05–5.0 $r$, was used for this purpose. In a typical series of 53 observations the mean of the difference in $r$ values between the ionization and photographic measurements as obtained in individual tests was 5.6±1.2 (S. D. of the mean) per cent.

Experimental work with both direct and scattered radiation at other than normal incidence indicates that a similar accuracy can be obtained under these conditions when experimentally determining correction factors for angle of incidence and scattering are used. The method is particularly adaptable to the determination of exposure of personnel to radiation for prolonged periods, including the approximation of the quality of radiation received, the calibration of equipment with a minimum of test exposures, and the standardization of radiographic and therapeutic technics.

Figure 5:
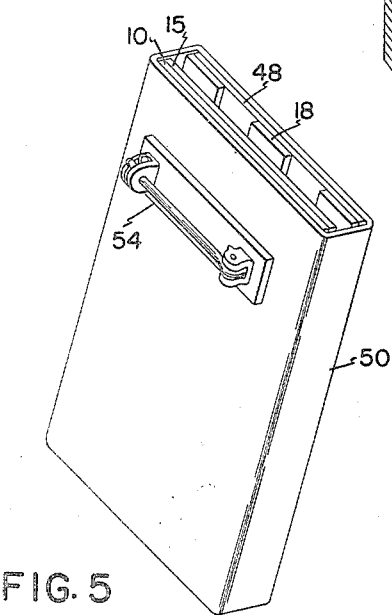
Fig. 5 is a view in perspective of the badge showing its rear face.

In Figs. 4–6 I have shown a preferred form of detecting apparatus suitable for subjection to unknown amounts of radiation and well suited for use in the practice of my novel method described above. The unit is designed to be worn in a casing of approximately the same dimensions as the identification badges commonly worn in many factories.

In the form shown in Fig. 6 I provide a radiating mask comprising a rectangular .5 mm. sheet of lead having one of its corners cut off as shown at 12. It is important that the sheet be of uniform resistance to radiation throughout its area in order to avoid the introduction of errors. Superposed on the mask 10 is a rectangular photosensitive film 14 of conventional type, either single or double coated and enclosed in a light-tight envelope 15. For purposes of identification I prefer to pre-expose a small rectangular area 16 of the film to weak radiation traversing a lead mask (not shown) having a number punched through it. As shown in Fig. 6 the dotted lines forming the number 137 represent a latent image on the film 14. This latent image is subsequently protected from further exposure by a lead mask. It will also be evident that when the film 14 is placed on the mask 10, one corner of the film will extend beyond the mask at the cut out corner 12.

One important element of the unit resides in a variable filter 17 including a sheet 18 of lead approximately .5 mm. thick, generally rectangular in shape and provided with a pair of parallel slots 20 and 22 running longitudinally from one end of the sheet 18. At the other end the sheet is doubled upon itself to form an area 24 in which the thickness is 1 mm. The overlaid portion of the sheet 18 covers the rear portion of the slot 20 but does not cover any of the slot 22. I secure to the sheet 18 a pair of copper plates 26 and 28, the plate 26 being superposed on the plate 28 and approximately .2 mm. thick while the plate 28 is approximately 3 mm. thick. The plates are secured together and to the sheet 18 by a cement which has no filtering effect and is not at all resistant to radiation. Furthermore the plates 26 and 28 are substantially wider than the slot 20 over which they extend but are short enough to leave a substantial portion of the slot 20 uncovered, as well as a portion which underlies the plate 26 and a further portion which underlies both the plates 26 and 28. Plates 26 and 28 are also long enough to both cover the folded up part of the mask 18 which underlies the slot 20. Consequently the plates 26 and 28, in connection with the folded part of the mask 18 defines four areas of differing resistance to radiation. The first area has zero resistance to radiation and consists in that part of the slot 20 which is uncovered. The second area is covered only by the plate 26; the third area is covered by both plates 26 and 28; and the fourth is covered by both plates and one layer of lead 0.5 mm. thick. Over the slot 22 I secure four .25 mm. cadmium plates 30, 32, 34 and 36, arranged in overlapping relation and substantially wider than the slot 22. The cadmium plates are thus arranged with the slot 22 to define five areas of differing resistance to radiation. The first area has zero resistance to radiation and consists in the uncovered area of the slot 22. The second area is covered only by the cadmium plate 30; the third by plates 30 and 32; the fourth by plates 30, 32, and 34; and the fifth by all the plates 30, 32, 34 and 36. No part of the slot 22 is overlaid with lead.

Through the double thickness portion 24 of the lead sheet 18 I bore three circular holes 40, 42 and 44 each of which differs in diameter from the other two, and each diameter is small enough to cut off rays striking the surface of the sheet 24 except those reaching the sheet through a given arc. For example, the middle size hole 40 may be of such diameter that it will pass only rays striking the surface 24 over an arc of 90°. The small hole 42 may be dimensioned to pass rays reaching the plate 24 through an arc of 60° while the largest hole 44 may pass rays reaching the plate over an arc of 120°. The diameter of the hole required to pass rays reaching the plate only through a given arc may be determined from the formula $$d = h \tan \frac{\phi}{2}$$

$d$ = diameter of the hole $h$ = the thickness of the lead plate, and $\phi$ = the arc through which the rays striking the plate will pass entirely through the hole.

Inasmuch as the lead is 1 mm. thick the diameters of the holes shown in the drawing are as follows: for hole 40, 1.0 mm.; for hole 42, 0.58 mm.; for hole 44, 1.73 mm.

Through one portion of the double thickness of lead 24 I also punch out a code sign of characteristic outline, different for each filter, such as that shown at 46. The combination of the code punch 46 and the latent image 16 serves to identify the film beyond question, after development, if any radiation sufficient to produce even a very slight density has been received by the film while it was under the filter. Various code arrangements will suggest themselves to those skilled in the art.

Placed over the filter is a rectangular piece 48 of cellophane or other material not resistant to radiation. The purpose of the sheet 48 is to protect the unit from dirt and extraneous materials which might affect the exposure of the film. If desired sheet 48 may be incorporated with the filter unit 17 by cementing it or otherwise fastening it so that it becomes an integral part of the filter unit 17.

The operative portions of the unit form in effect a sandwich in which the film 14 is contained between the radiation mask 10 and the filter unit 17. The latent image "137" is protected by the lead sheet 18. The assembly is mounted in a casing 50 of material essentially transparent to radiation and having a rectangular slot 52 in one face through which the filter can be viewed and exposed to radiation through the transparent cellophane sheet 48. If desired, the lead sheet 10 may be cemented in place in the casing 50 as may be the filter unit, since it will be necessary to remove only the envelope containing exposed film when it is desired to determine the amount of radiation to which the film has been exposed. I contemplate that personnel employed in the neighborhood of radiation emitting equipment will be provided with detecting badges of the sort described herein and that at convenient periods, such as a week, the film from each badge will be developed simultaneously with the development of a control film which has been exposed to a predetermined known quantity and quality of radiation.

Figure 7:
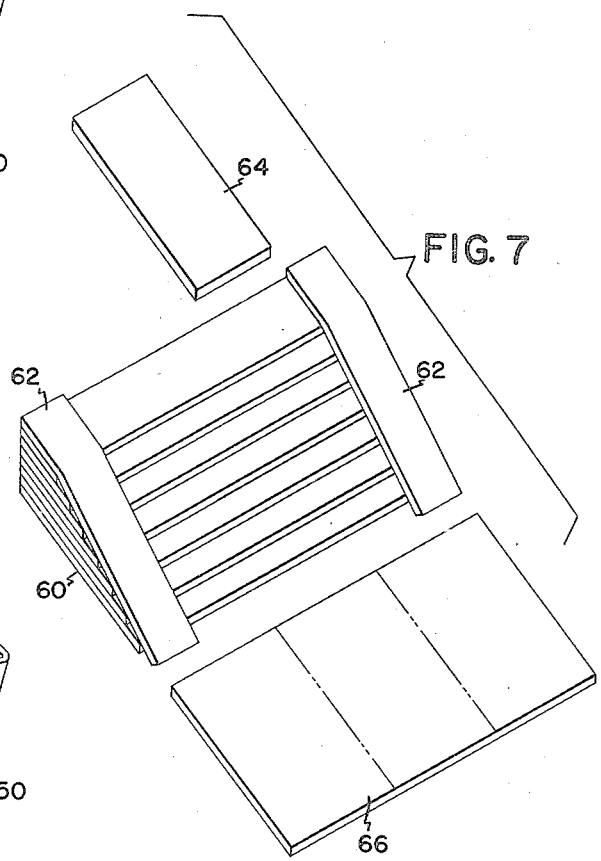
Fig. 7 is an exploded view in perspective of the control film and filter employed therewith.

In Fig. 7 I have shown one form of apparatus which may conveniently be employed in connection with the treatment of the control film. I provide a plurality of plates of copper cemented together to form a stack 60 in which the plates are arranged in overlapping relation to form a plurality of areas of different resistance to radiation. The stack is provided at its edges with a pair of lead bars 62 forming a frame for the stack and extending at one end beyond the stack to define an area of zero resistance to radiation. I provide also a lead bar 64 equal in length to or longer than the frame members 62 and equal in width to one third of the distance between the inside edges of the frame member 62. The control film is shown at 66 and it is important to note that its emulsion number should be identical with that of the film 14 used in the badge. In practice the control film 66 and the numerous badge films 14 should be taken from the same batch of film so that they may be identical in all respects.

To carry out the method I place the stack 60 over the film 66 and place the bar 64 over the stack with one edge against the inside edge of one of the lead bars 62 so that one third of the film lying between the bars 62 will be covered by the bar 64 while the remaining two thirds will be covered only by the stack 60. In this condition I expose the film to a carefully predetermined quantity and quality of radiation. After this first exposure, I move the bar 64 to the other side against the opposite frame 62 and expose the film again to an amount and quality of radiation as nearly as possible identical to that of the first exposure. When the second exposure is completed, I then have a film in which one area has been exposed only to the first exposure; a second area exposed only to the second exposure; and a central area exposed to both exposures. In addition each of the three areas contains sub-divisions subjected to different quantities of radiation. In the areas beyond the stack and within the bars 62 there has been zero filtration, and the amount of filtration increases in steps toward the back of the stack 60. In addition there are two zones, one on each side of the film, which being under lead members 62 have been protected from exposure, the thickness of lead members 62 being so chosen as to absorb practically all radiations reaching their surface during the two control exposures. Normally these two zones will remain practically clear after development showing only whatever small amount of fog is characteristic of the emulsion and development used. Any marked deviation from this normal amount in either the control film 66 or sample film 14 is therefore recognizable and measurable and may be taken into consideration in the final calculation if deemed necessary.

The next step is to develop the control film 66 simultaneously with the sample film 14. I refer to this as "co-development" to indicate that both films are developed in the same baths and treated identically.

After the films have been developed, the sample film 66 will be darkened, as to each area thereof, by an amount responsive to the amount of radiation reaching the film, taking into consideration the factors involved in development thereof. As shown in Fig. 7 each of the three differently exposed areas of the film will in turn be divided into eight sub-divisions beginning with the unfiltered area and decreasing in density to that portion underlying the full thickness area of the stack 60. The next step is to measure the density of the control film 66 on a suitable densitometer. The values of density thus obtained for the different areas of the film are plotted to form a curve similar to graph A of Fig. 1 and the characteristic curve is then constructed to produce a result similar to that shown in graph B of Fig. 1. As previously explained, the curve is characteristic of the material, developing process and densitometer used. The amount of blackening produced on the different areas of the film 14 is also determined on the same or an identically calibrated densitometer. As previously explained, it is easy to correlate the densities from the characteristic curve for the control film 66 with the densities on the sample film 14 and thereby arrive at the quantity of radiation to which the sample film has been exposed. Furthermore the quality of the radiation may be determined by reference to the equations above developed.

In addition to determining the quantity and quality of the unknown radiation on the sample film 14, the detector badge also provides means for determining the direction from which the radiation emanated. The radiation mask 10 effectively cuts out back radiation except for the cut out corner portion 12. Consequently the presence or absence of back radiation may be determined at once by an examination of that portion of the film 14 which projected beyond the cut off corner 12. As for radiation reaching the front of the film, the cut off angles of the holes 40, 42 and 44 provide sufficiently accurate means for determining the angle of incidence and/or the extent of scattering of the received radiation. For example, if the film areas underlying all of the holes present the same density per unit area, it follows that the unit was exposed to a large amount of radiation striking the unit at right angles to the plane of the film. If the area under the largest hole is darker than the smaller holes, the implication is that the radiation was scattered over a wide range of angles of incidence. If the area underlying the largest hole is dark and the areas underlying the smaller holes are not blackened at all, the inference is that the radiation reaches the unit at relatively acute angles. The sharpness of the images of the holes also provides visual indication of the amount of scattering. The sharper the image, the less is the scattering. The angle of incidence may be approximated by studying the shapes of the images of the holes 40, 42 and 44 and by their presence or absence. For instance, with the three holes previously described, having an effective arc of 60, 90, and 120 degrees degrees respectively, it is obvious that if the angle of incidence of direct radiation be less than 30° there will be blackening under the three holes; if between 30° and 45°, under two holes only; if between 45° and 60°, under one hole only; and if greater than 60°, no image of the holes will be found while there might be appreciable densities under the slots. Furthermore, examination of the shapes of the images will obviously permit interpolation between these values because the shapes of the images become more elliptical as the angle of incidence increases. During experiments, an accuracy within plus or minus 5° has been obtained by this method.

It should be pointed out that the radiation detector badge 14 may be employed to record radiation reaching a fixed location. For example, if it is suspected that unknown amounts of radiation are penetrating a given room, the quantity, quality and direction of the radiation can readily be determined by placing several detector units or badges at specified locations and angles within the room. For such uses, it is generally not necessary to employ the back radiation resisting mask 10, and this must be regarded as an optional feature advantageous for particular uses but not necessary to the proper functioning of the apparatus or the performance of my novel method. Moreover while the combination of copper and cadmium plates on the lead plate 18 are well suited to cover a very wide range of radiation qualities, it may be found desirable to use other thicknesses or other metals, or to employ only the two copper plates, particularly where the dosage can fairly well be predicted or where the extent of radiation is reasonably limited in view of the nature of the radiation emitting equipment found in the vicinity. The combination of the copper plates and the cadmium plates makes it possible to cover very extensive ranges of radiation, including ordinary X-rays, both soft and hard, as well as radiation from radioactive material and such apparatus as cyclotrons and betatrons. The filter unit is thus well adapted for general use. Incidentally, it should be noted that the cadmium portion of the filter will make it possible to record neutron activity. Moreover cadmium is relatively cheap and easily machined within accurate limits and thus compares favorably with other available radiation resistant materials. In fact, it may in some cases be advisable to use cadmium for the masks as well as for the filters.

Those skilled in the art will readily appreciate that I have described but one preferred form of apparatus and that many variations will be appropriate to accommodate different conditions of use.

Having thus disclosed my invention, what I claim as new and desire to secure by Letters Patent of the United States is:

1. A radiation detecting device comprising a sensitive film, a filter superposed over said film, said filter including areas of different resistance to radiation, a first radiation mask covering a portion of said film and provided with a plurality of circular perforations of different diameters, the diameter of each perforation being relatively small with respect to the thickness of said first mask to cut off radiation reaching the first mask at relatively small angles of incidence, and a second radiation mask covering the back of the film.

2. A radiation detecting badge comprising a casing, a first radiation mask disposed within said casing, a sensitive film disposed upon and projecting beyond said mask, a second mask disposed on said film and having a slot, and a plurality of plates of radiation resistant material, each plate exhibiting substantially uniform resistance to radiation per unit area, said plates being disposed in overlapping relation over only a portion of the slot in said mask and thereby defining an area exposed to radiation, said film having the latent image of a predetermined symbol, said mask being provided with an aperture having the outline of the image of a predetermined identifying symbol, and provided with a plurality of circular holes of differing diameter, the diameter of each hole being relatively small with respect to the thickness of the mask to cut off radiation reaching the mask at relatively small angles of incidence.

3. A radiation detecting device comprising a container of material capable of transmitting radiation, a radiation mask disposed against one interior wall of said container, a film overlying said mask and having one portion extending beyond the mask, a filter superposed on a portion of said film and defining areas of different resistance to radiation, and a second mask covering another portion of the film and provided with a plurality of through and through circular holes of different diameter and having parallel axes, the diameter of each hole being relatively small with respect to the thickness of said second mask to cut off radiation reaching the second mask at relatively small angles of incidence.

4. The method of determining the radiation dosage upon a sample film including areas subjected to radiation while under different degrees of filtering, comprising placing a stepped filter upon a control film of the same photographic character as the sample film, masking one portion of the control film, subjecting the control film to a first dose of radiation, masking one of the portions of the film exposed to said first dose, subjecting the control film to a second dose of radiation substantially equal to the first dose to produce a film having one area exposed through stepped filtering to both doses of radiation and two other areas each exposed through stepped filtering to a different one of said doses, co-developing the control and sample films, and measuring the density of the various areas of the control film and of the sample film.

5. A method of determining the amount of radiation to which a sample film has been exposed, comprising masking one portion of the control film, subjecting the control film to a first dose of radiation, masking one of the portions of the film exposed to said first dose, subjecting the control film to a second dose of radiation substantially equal to the first dose, thereby producing a film having one area exposed to both doses and two areas each exposed to a different one of the doses, co-developing the sample and control films, and measuring the densities of the control and sample films.

6. A method of determining the amount of radiation to which a sample film has been exposed, comprising masking one portion of the control film, subjecting the control film to a first dose of radiation, masking one of the portions of the film exposed to said first dose, subjecting the control film to a second dose of radiation substantially equal to the first dose, thereby producing a film having one area exposed to both doses and two areas each exposed to a different one of the doses, co-developing the sample and control films, and measuring the densities of the control and sample films on the same or identical densitometers.

JEAN KIEFFER.

REFERENCES CITED

The following references are of record in the file of this patent:

UNITED STATES PATENTS

| Number | Name | Date |
|---|---|---|
| 1,917,433 | Cressler | July 11, 1933 |
| 1,953,249 | Michel | Apr. 3, 1934 |
| 2,251,265 | Black | Aug. 5, 1941 |
| 2,258,593 | Black | Oct. 14, 1941 |
| 2,286,748 | Martin | June 16, 1942 |
| 2,399,650 | Moyer | May 7, 1946 |
| 2,426,286 | Stadler | Aug. 26, 1947 |
| 2,426,884 | Kieffer | Sept. 2, 1947 |

FOREIGN PATENTS

| Number | Country | Date |
|---|---|---|
| 222,027 | Germany | May 17, 1910 |
| 325,080 | Great Britain | Feb. 13, 1930 |

OTHER REFERENCES

"X-Rays in Practice," by Sproull, McGraw Hill Book Co., January 1946, pp. 177–181 and 432–433.